United States Patent [19]
Kawamura et al.

[11] 3,953,868
[45] Apr. 27, 1976

[54] DEVICE FOR RECORDING CAMERA DATA

[75] Inventors: Tomoaki Kawamura, Kawasaki; Syohei Ohtaki; Soichi Nakamoto, both of Machida; Kiyoshi Takahashi, Kunitachi,, Japan

[73] Assignee: Canon Kabushiki Kaisha, Tokyo, Japan

[22] Filed: Oct. 9, 1974

[21] Appl. No.: 513,395

[30] Foreign Application Priority Data
Oct. 15, 1973 Japan.............................. 48-115490
Dec. 20, 1973 Japan.............................. 48-143067

[52] U.S. Cl. ............................................. 354/109
[51] Int. Cl.² ......................................... G03B 17/24
[58] Field of Search............................. 354/105, 109

[56] References Cited
UNITED STATES PATENTS
2,987,976   6/1961   Martin .............................. 354/109
3,111,886   11/1963  Berning............................. 354/109
3,827,070   7/1974   Hoerenz............................ 354/105
3,827,802   8/1974   Pfeifer ............................. 354/109
3,849,784   11/1974  Holzapfel.......................... 354/109
3,858,967   1/1975   O'Donnell......................... 354/105

*Primary Examiner*—John F. Gonzales
*Attorney, Agent, or Firm*—Toren, McGeady and Stanger

[57] ABSTRACT

A camera data recording device having an indication means comprising solid-state illuminating element on the back plate of the camera, connected to a control device provided outside the camera by means of a connector, in which various data are selected and set by the control device.

6 Claims, 10 Drawing Figures

DEVICE FOR RECORDING CAMERA DATA

The present invention relates to a device for recording camera data, more particularly a recording device for recording the data from the back side of a sensitive film.

Conventionally, various recording devices have been proposed, and according to such conventional arts the data recording device is provided within the back of a camera and photographing data such as date and time, etc. are recorded on the film at the time of photographing. However, data which are desired to be recorded on the photograph are not limited to the data and time, but it is often necessary to record various measurements of scientific experiments together with objects or to record serial number of the objects.

However, if such a recording device which can record selectively all kinds of necessary data is incorporated inside the back of a camera, it is necessary to enlarge the camera size extraordinarily, thus hindering practical photographing.

Therefore, one object of the present invention is to provide a data recording device which can record selectively various necessary data simultaneously on the film, and has good performance.

In order to attain the above object, the recording device of the present invention is divided into a control section and an output section, and only a data indication means comprising an illuminating element of the output section is incorporated inside the camera and connected through a connector on the camera to the control section separated from the camera so that the recording device can be controlled from outside.

According to the structure of the recording device as above, it is possible to record selectively various kinds of data without necessity of changing the camera size and shape.

The present invention will be more clearly understood from the following descriptions in reference to the attached drawings.

FIG. 6b is a cross sectional view of the data recording portion of the embodiment of FIG. 6a.

FIG. 7 is a cross sectional view of a modification of the embodiment shown in FIG. 6a.

Figure 1:
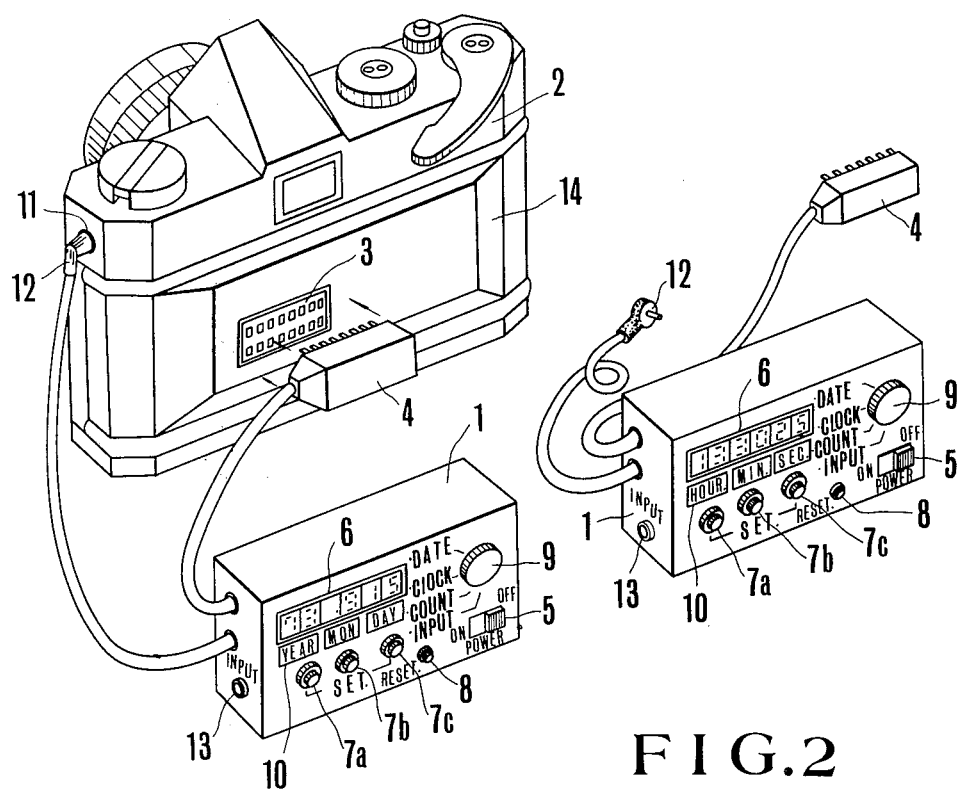
FIG. 1 is a slant view showing an outer appearance of the device of the present invention.

In FIG. 1, 1 is a data control device, 2 is a camera body, 3 is a connecting socket provided on a back plate 14 of the camera, 4 is a connector, 5 is a power source switch provided on the control device, 6 is an indicating window having a data indicating means such as an illumination diode seven segment, 7a to 7c are respectively a data setting button, 8 is a data resetting button, 9 is a dial for changing over data components, which selects the kind of data to be recorded and changes over the data components to be indicated to the output section 17 and the indication window 6 and is used for indicate prescribed data names on a data name indication window 10. 11 is a conventional terminal for flash synchronism, 12 is a connecting code, and 13 is a connecting terminal for inputs from outside.

Figure 2:
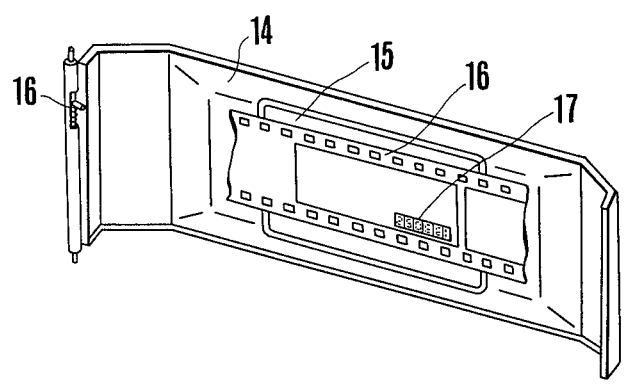
FIG. 2 is a slant view showing the inner side of the back plate of a camera.
Figure 3:
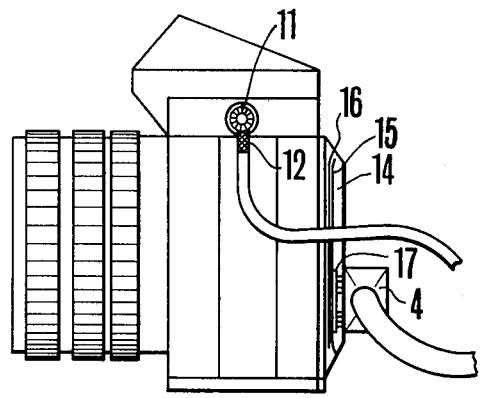
FIG. 3 is a side view of a camera.

The output section is, as shown in FIG. 2 and FIG. 3, incorporated within the camera body. Thus, the solid-state illumination element 17, such as an illumination diode seven segment is arranged in such a manner that its surface contacts the film 16 by means of an opening through a pressure plate 15. In this embodiment, data are recorded directly on the back side of the sensitive material by contacting the solid-state illumination element to the sensitive material. However, the present invention should not be limited to this embodiment but other means such as a recording optical system may be used.

Figure 4:
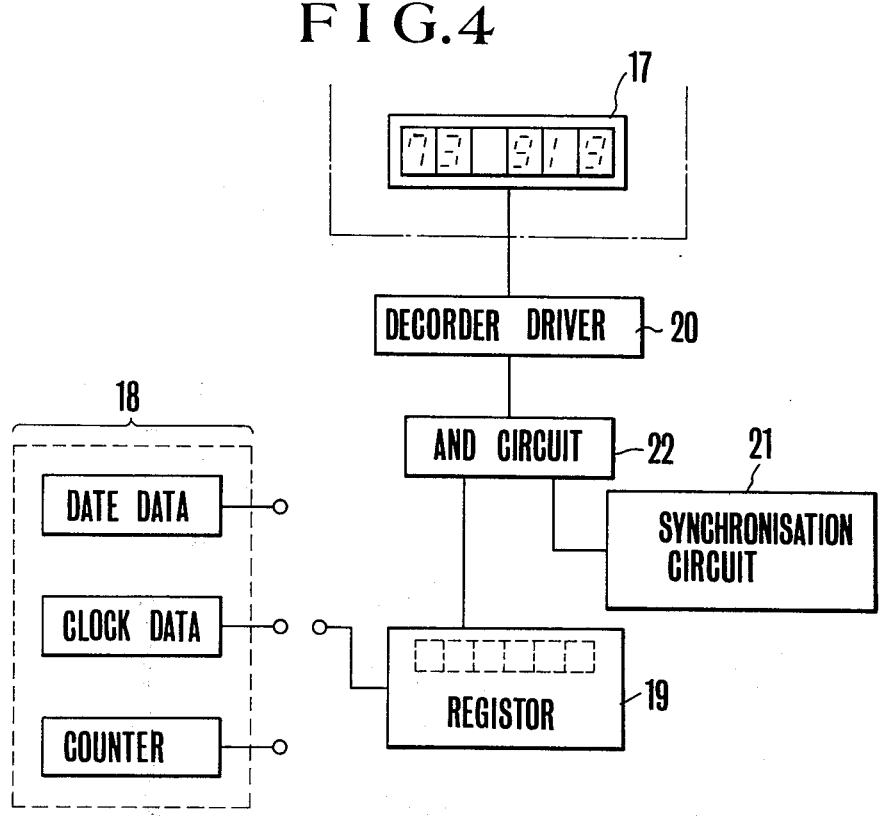
FIG. 4 is a block diagram showing the operation of the device according to the present invention.

The block diagram of the control section is shown in FIG. 4. The data portion 18 is composed, for example, of an oscillator and a switch for actuating the oscillator.

The register portion 19 is composed of a register for storing signals and an indicator for indicating the contents of the register to the outside.

The decoder driver 20 is composed of a conversion circuit for converting the binary signals of the register into signals for illuminating the illumination diode seven segment and driving circuit for the illumination diode, and these circuits are normally composed by a single integrated circuit.

Desired data of the data portion 18 are selected by means of the change-over dial and are connected to the register 19.

Now explanations will be made for the case when date data are selected.

By pushing the data setting buttons for the date data, a switch receiving the signals from the oscillator in correspondence to the respective data components (year, month and day) is put on to give oscillating pulses to the register. The components thus given are indicated by the indicator, and the setting button is released when and if necessary data are given. In this way necessary date data are set in the register.

Next, signals are sent for a certain constant time in synchronization with a flash synchronization contact S of the camera, when the output of the synchronization circuit 21 coincides with the output of the register 19 at the AND gate and the camera shutter is released, the contents of the register 19 are sent to the illuminating element 17 through the decoder driven 20 only for the constant time, and thus the data are recorded on the back side of the film.

Figure 5:
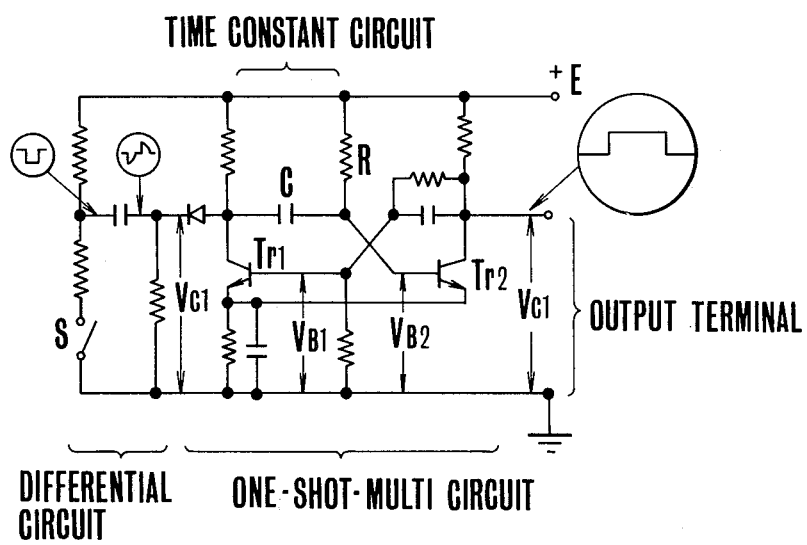
FIG. 5 is a circuit diagram used for the device of the present invention.

One embodiment of the synchronization circuit is shown in FIG. 5.

Under a stabilized condition Tr1 is maintained "off" and Tr2 is maintained "on". But the synchronization contact S closes following the shutter release and generates pulses. These pulses enter the control section through the synchro-terminal 11, the synchro-codes 12, 12', and negative triggers are added to the next step by the differential circuit so that Vb2 gets down to turn Tr2 off and Tr1 on. In this way, the on and off of Tr1 and Tr2 are interchanged and Vb2 is negatively biased. When the potential Vb2 is increased along the lapse of time due to the time constant circuit and gets higher than the cut off voltage, Tr2 gets on and Tr1 gets off to regain the stabilized condition. In this way, a rectangular wave Vc2 which is determined by the time constant circuit is produced at the output voltage terminal, and a driving signal is sent to the AND gate to determine the recording time.

Thus, the solid illuminating element is maintained in its illuminating state for the determined recording time and the data recording is effected.

When a photographing time is desired to be recorded, the dial 9 is made to agree with the CLOCK signal and the buttons 7a to 7c are operated in a similar way as above to indicate numeral figures representing hour, second and minute in the window 6, and the seven segment is illuminated in association with the shutter release to effect the recordation on the film.

When the dial is set at the count position, the synchro-contact opens and closes even time the shutter operates and pulses are computed in the control device to indicate the film frame number in the window 6.

Further, in case where measurement data of measuring instruments, for example, are to be recorded, the dial 9 is set to the INPUT signal and the output portion of the instruments is connected to the input terminal 13.

In the above embodiments, the solid illuminating element is arranged close to the film and data indicated by its illumination are recorded directly. In this case, however, as the light from the solid-state illuminating element is a divergent light, the actual illuminating surface is separated from an emulsified surface of the film by a clearance in order to avoid the movement of the element together with the film and the pressure plate so that the image recorded on the film is obscure to some degree.

Figure 6A:
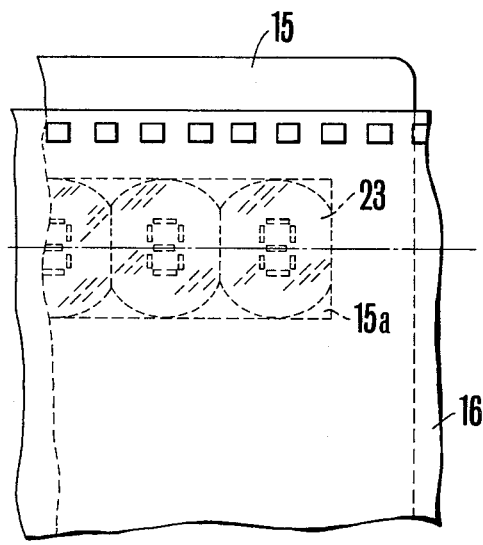
FIG. 6a is a front view of the data recording portion of another embodiment of the present invention.
Figure 6B:
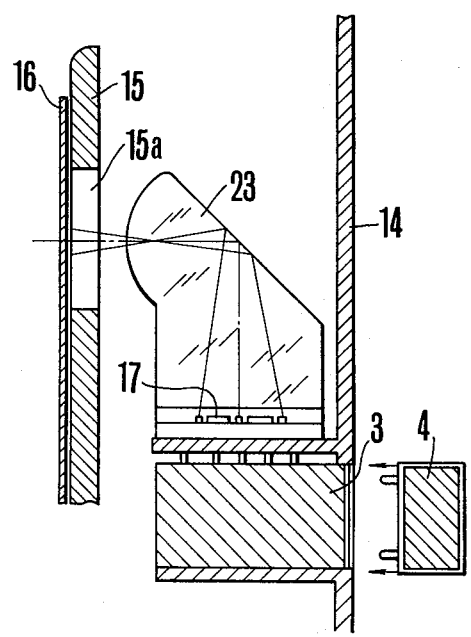

In the embodiment shown in FIGS. 6a and b, an image forming optical system is provided between the solid-state illuminating element and the film surface in order to eliminate the above defect, and a reflection mirror is provided in the optical path to make the device more compact. The members and elements having the same functions of the members and elements shown in the first embodiment are referred to by the same numerical references.

In FIGS. 6a and b, 16 is a film, 15 is a pressure plate, 15a is a light-transmission window provided on the pressure plate, 17 is a solid illuminating element, 23 is an image forming optical system having a reflection mirror in its optical path and constructed in a single integrated plastic body. 3 is a socket for connecting the connector, which is attached on the inside of the back plate 14 removable attached to the camera body.

Figure 7:
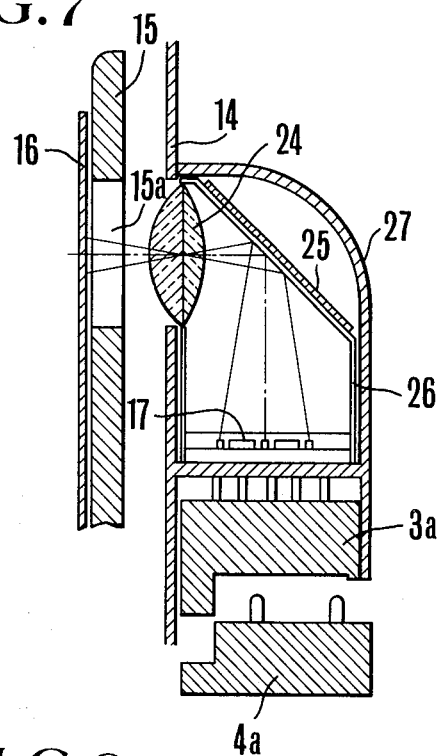
Figure 8:
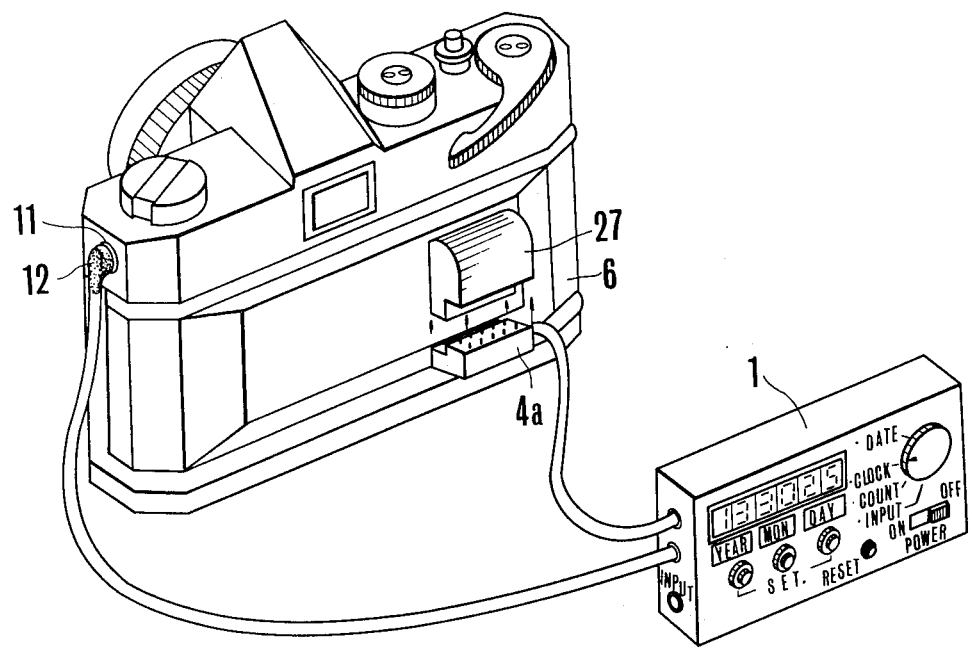
FIG. 8 is a slant view showing the outer appearance of the modification shown in FIG. 7.

FIGS. 7 and 8 show another embodiment of the present invention. In this embodiment, the illuminating element is attached to the outside of the back plate of the camera, and the connector 4a is inserted from below so that the back plate can take an ordinary size except for the illumination portion and has an advantage over the previous embodiments. In the figures, 17 is an illuminating element, 24 is an image forming lens, 25 is a reflection mirror supported by a structural member 26. These members are covered together with the socket 3a by a cover 27 supported on the back plate 14.

Figure 9:
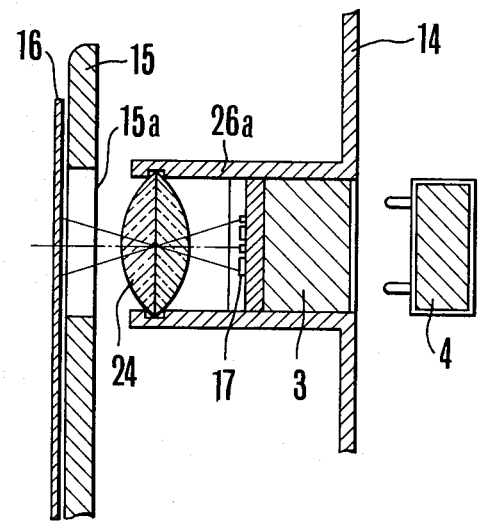
FIG. 9 is a cross sectional view showing still another embodiment of the present invention.

In this embodiment, the reflection surface and the image forming lens are constructed as separate members as contrary to the previous embodiments, but all of the embodiments are common in that the light from the illuminating element is reflected on the reflection surface and imaged on the back side of the film by means of an image forming lens. However, the image forming optical system of the present invention should not be limited to this embodiment, but it may be constructed as shown in FIG. 9 where the light from the solid illuminating element is directed to the image forming lens without using a reflection surface.

What we claim is:

1. A camera data recording device comprising:
    a camera body containing film therein;
    a data control device provided separately from said camera body, said control device including data selecting means and data setting means;
    solid-state illuminating means being provided at the back of said film within the camera; and
    a connecting element for connecting the control device to the illuminating means in said camera body,
    said illuminating means being controlled by control signals from the data setting means for recording the digital data on the film within the camera.

2. A camera data recording device according to claim 1, in which the illuminating means is controlled by a synchro-contact means of the camera and illuminates for a predetermined time.

3. A camera data recording device according to claim 1, wherein said camera body contains an image forming optical system and a back plate and in which the solid illuminating means and the image forming optical system are provided on the back plate of the camera and, when the illuminating means illuminates, data are recorded on the film through the optical system.

4. A camera data recording device according to claim 3, in which the optical system includes a reflection optical system in its optical path.

5. A camera data recording device according to claim 3, in which the solid-state illuminating means is an illuminating diode.

6. A camera recording device according to claim 1 wherein said data control device includes a clock oscillator and wherein said data selecting means includes adjustable switching means and said setting means is a switching element and wherein said recording device includes a register for receiving digital control signals corresponding to data set into said data setting means and a decoder for providing drive signals for said solid-state illuminating means.

* * * * *